US010853696B1

(12) United States Patent
Luo et al.

(10) Patent No.: US 10,853,696 B1
(45) Date of Patent: Dec. 1, 2020

(54) EVALUATION OF CONTENT ITEMS AGAINST POLICIES REGULATING CONTENT PRESENTATION BY AN ONLINE SYSTEM USING MACHINE LEARNING

(71) Applicant: Facebook, Inc., Menlo Park, CA (US)

(72) Inventors: Enming Luo, Mountain View, CA (US); Emanuel Alexandre Strauss, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 43 days.

(21) Appl. No.: 16/382,162

(22) Filed: Apr. 11, 2019

(51) Int. Cl.
*G06K 9/62* (2006.01)
*G06N 20/00* (2019.01)
*G06T 7/00* (2017.01)

(52) U.S. Cl.
CPC ......... *G06K 9/6262* (2013.01); *G06K 9/6218* (2013.01); *G06K 9/6257* (2013.01); *G06K 9/6267* (2013.01); *G06N 20/00* (2019.01); *G06T 7/0002* (2013.01); *G06T 2207/20081* (2013.01)

(58) Field of Classification Search
CPC .. G06K 9/6218; G06K 9/6262; G06K 9/6257; G06K 9/6267; G06N 20/00; G06T 7/0002; G06T 2207/20081

USPC .................................................. 382/157, 159
See application file for complete search history.

(56) References Cited

U.S. PATENT DOCUMENTS

| 2006/0149623 A1* | 7/2006 | Badros ................... G06Q 30/02 |
| | | 705/14.66 |
| 2016/0234276 A1* | 8/2016 | Ouyang ................. H04L 65/403 |
| 2017/0262635 A1* | 9/2017 | Strauss .................. G06F 21/577 |

* cited by examiner

*Primary Examiner* — Daniel G Mariam
(74) *Attorney, Agent, or Firm* — Fenwick & West LLP

(57) ABSTRACT

An online system uses a model to detect violations of policies enforced by the online system for content uploaded to the online system by users for viewing by other users. The online system trains the model in multiple stages. To train the model, the online system obtains a set of training content items, with each content item of the set labeled with both a policy violated by the content item and a source of the content item, which acts as a proxy for a sub-category identifying a way in which the content item violated the policy. In the first stage, the online system trains the model using the set of training content items. In a second stage, the model of trained to predict policy violations from content items that are not labeled with a source. For example, the second stage is performed by freezing earlier layers in the model.

20 Claims, 4 Drawing Sheets

EVALUATION OF CONTENT ITEMS AGAINST POLICIES REGULATING CONTENT PRESENTATION BY AN ONLINE SYSTEM USING MACHINE LEARNING

FIELD OF THE TECHNOLOGY

This disclosure relates generally to evaluating content items against policies enforced by an online system, and more specifically to using machine learning to identify content items that violate a policy enforced by the online system.

BACKGROUND

Many online systems that receive content from users and subsequently present the received content to other users enforce various policies to regulate presentation of content to users. For example, various policies enforced by an online system prevent the online system from presenting images including certain content to users. In an example, an online system enforces a policy that prevents presentation of images including sexual content to users. As another example, an online system enforces a policy that prevents presentation of images that include illegal or violent content to users.

Additionally, many online systems also apply one or more machine learning models to images obtained by the online systems to generate feature vectors representing the obtained images. For example, an online system applies a multi-layer network to received images, with different layers identifying different features of an image—some layers identify edges and corners within an image, while other layers provide semantic information about objects in the image. Although conventional machine learning models applied by online systems identify features of images obtained by the online system, image features determined by conventional machine learning models provide little information for determining whether images violate one or more policies enforced by the online system.

SUMMARY

An online system obtains content items from one or more users and subsequently presents the content items to one or more other users. Additionally, the online system maintains one or more policies that regulate presentation of obtained content items to users, allowing the online system to prevent presentation of certain content to users. A content item determined to violate one or more of the maintained policies is withheld from subsequent presentation to users. In various embodiments, different policies identify different objects or characteristics of objects included in images of content items, preventing presentation of images including certain objects or including objects having certain characteristics from presentation to users. For example, a policy prevents presentation of images including sexual content, another policy prevents presentation of images including violent content, another policy presents presentation of images including illegal content, while an additional policy prevents presentation of images including offensive text.

To more quickly and more efficiently evaluate content items, such as images, for compliance with the one or more maintained policies, the online system may generate embeddings for images obtained by the online system and use an embedding for an image to determine whether the image violates a maintained policy. Because the online system maintains a limited number of policies, the online system obtains a set of training content items that were previously determined to have violated one or more of the maintained policies to generate the model. For example, one or more reviewers had previously identified each content item of the training set as violating a policy maintained by the online system. As another example, one or more classifiers were previously applied to each training content item of the set that identified each content item of the training content items as violating a maintained policy.

Each training content item of the set is labeled with a combination of maintained policies that a training content item of the set was determined to have violated and a source from which the training content item was obtained by the online system. For example, a training content item is labeled with a combination of an identifier of a policy that the training content item was determined to have violated and an identifier of a source from which the training content item was obtained. Because of the limited number of policies maintained by the online system, if training content items of the set were only labeled with the maintained policy they were determined to have violated, different training content items labeled as violating a particular policy would have differing characteristics that are too diverse to generate a model for determining whether images violate one or more policies. For example, only labeling training content items with a maintained policy each training content item were determined to have violated would result in a model likely to generate embeddings that would overfit the set of training content items, while providing inaccurate results for content items outside of the set of training content items. Hence, the diversity of training content items having a common label when using training content items that are labeled with only a policy violated by different training content items would result in a model that would not generalize well to identifying policies violated by content items outside of the training content items.

Accordingly, the online system more specifically labels each training content items with a combination of a policy that a training content item was determined to have violated and a source from which the training content item was obtained. This labeling uses the source from which a training content item was obtained as a proxy for a reason (e.g., a characteristic) why the training content item was determined to have violated a policy, allowing the online system to identify different classes of training content items (i.e., training content items from a specific source) as having similar content. In various embodiments, a source from which a training content item was obtained is a user from whom the online system obtained the training content item. In other embodiments, the online system applies one or more clustering methods to the training content items of the set, to generate clusters of the training content items, where each cluster includes training content items having a common characteristic. Hence, a source from which one or more training content items are obtained may be any homogeneous group, where content items in a group have at least one common characteristic. Including the source from which a training content item was obtained by the online system allows the online system to use the source from which the training content item was obtained as a proxy for a reason why the training content item violated a maintained policy. This labeling of training content items with both a violated policy and a source results in a set of training content items with more fine-grained labels having groups of more visually similar training content items with a common label.

To train a machine learning embedding model generating an embedding describing evaluation of content items (such as images) against one or more of the maintained policies, the online system applies the machine learning embedding model to each training content item of the set. Application of the machine learning embedding model to a training content item of the set generates an embedding for the training content item that identifies a combination of a source of the training content item determined by the machine learning embedding model (i.e., a "determined source") and a maintained policy that the machine learning embedding model determines the training content item violated (i.e., a "determined policy"). The machine learning embedding model may use any suitable characteristics of a training content item to generate the combination of the determined source of the training content item and the determined policy that the training content item violates in various embodiments.

For each training content item of the set to which the machine embedding learning model was applied, the online system compares the combination of the determined source of the training content item and the determined policy violated by the training content item to the corresponding label of the training content item, which identifies the combination of the maintained policy the training content item was previously determined to have violated and the source from which the training content item was obtained. The online system updates the machine learning embedding model based on comparison of the combination of the determined source of the training content item and the determined policy violated by the training content item to the corresponding label of the training content item (which identifies the combination of the maintained policy the training content item was previously determined to have violated and the source from which the training content item was obtained). For example, based on the comparison of the combination of the determined source of the training content item and the determined policy violated by the training content item to the corresponding label of the training content item, the online system modifies one or more weights between nodes in a neural network model. The online system subsequently stores the updated machine learning embedding model. By training the machine learning embedding model from training content items each labeled with a source of the training content item and a policy violated by the training content item, the machine learning embedding model is trained using more similar groups of training content items (e.g., training images having a common label of an image's source and the policy violated by an image are visually similar). This results in the updated machine learning embedding model providing more accurate results for evaluating policies enforced by the online system that content items outside of the set of training content items violate.

From the embeddings generated by the updated machine learning embedding model, the online system generates a classification model that predicts a maintained policy violated by an image based on the embedding generated for the image by the updated machine learning embedding model that identifies a combination of a source of the training content item determined by the machine learning embedding model (i.e., a "determined source") and a maintained policy that the machine learning embedding model determines the training content item violated (i.e., a "determined policy"). In some embodiments, the online system generates the classification model by freezing weights in layers in a neural network prior to an output layer of the neural network and modifies weights between the output layer and an adjacent layer prior to the adjacent layer by applying the classification model to training content items determined to have violated a maintained policy and labeled with the violated policy, comparing the policy the classification model determined a training content item violated to a label identifying a policy the training content item violated, and modifying weights between nodes in the output layer and nodes in the adjacent layer prior to the output layer. Hence, the online system may use the machine learning embedding model as the classification model identifying a policy that a content item violated based on the embedding identifying the combination of the source of the content item and a policy the content item was determined to have violated. Alternatively, the classification model is a separate model that receives the embedding for a content item identifying a combination of the determined source and the determined policy and selects a maintained policy the content item violates based on the embedding for the image. In various embodiments, the classification model generates a value indicating an image does not violate at least one policy maintained by the online system. Because the machine learning embedding model from training content items was trained using more similar groups of training content items (e.g., training images having a common label of an image's source and the policy violated by an image are visually similar), the machine learning embedding model is more readily generalizable to a broader range of content items, improving the accuracy and applicability of the resulting classification model.

Figure 1:
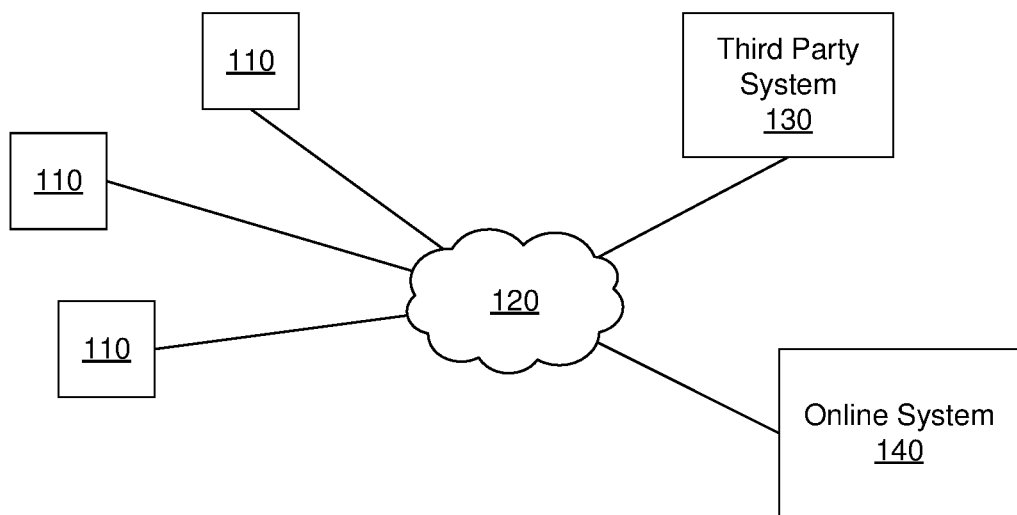
FIG. 1 is a block diagram of a system environment in which an online system operates, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Augmenting conventional machine learning models used by online systems to identify image features to also identify policies violated by an image is impractical. As online systems typically enforce a limited number of policies, different images identified as violating a particular policy enforced by an online system often have diverse characteristics. The divergent characteristics of images that violate a specific policy prevent online systems from accurately training a machine learning model to identify policies violated by images based on characteristics of the images. This prevents conventional online systems from using images previously identified as violating one or more specific policies enforced by the online systems regulation presentation of content to augment machine learning models identifying characteristics of images to also accurately identify a policy violated by an image. The divergent characteristics of images violating a specific policy prevent a model trained from characteristics of images that violated one or more policies from accurately generalizing to images other than those used train the model. Accordingly, conventional online systems both generate feature vectors representing images through one or more machine learning models and separately evaluating images against policies enforced by the online system, increasing both time and computational resources used to evaluate images for compliance with one or more policies enforced by the online system.

To more quickly and more efficiently evaluate content items, such as images, for compliance with the one or more maintained policies, the online system may generate embeddings for images obtained by the online system and use an embedding for an image to determine whether the image violates a maintained policy. Because the online system maintains a limited number of policies, the online system obtains a set of training content items that were previously determined to have violated one or more of the maintained policies to generate the model. Each training content item of the set is labeled with a combination of a maintained policy that a training content item of the set was determined to have violated and a source from which the training content item was obtained by the online system. For example, a training content item is labeled with a combination of an identifier of a policy that the training content item was determined to have violated and an identifier of a source from which the training content item was obtained. Because of the limited number of policies maintained by the online system, if training content items of the set were only labeled with the maintained policy they were determined to have violated, different training content items labeled as violating a particular policy would have differing characteristics that are too diverse to generate a model for determining whether images violate one or more policies. For example, only labeling training content items with a maintained policy each training content item were determined to have violated would result in a model likely to generate embeddings that would overfit the set of training content items, while providing inaccurate results for content items outside of the set of training content items. Hence, using training content items that are labeled with a policy violated by different training content items would result in a model that would not generalize well to identifying policies violated by content items outside of the training content items.

Hence, the online system more specifically labels each training content items with a combination of a policy that a training content item was determined to have violated and a source from which the training content item was obtained. This labeling uses the source from which a training content item was obtained as a proxy for a reason (e.g., a characteristic) why the training content item was determined to have violated a policy, allowing the online system to identify different classes of training content items (i.e., training content items from a specific source) as having similar content. In various embodiments, a source from which a training content item was obtained is a user from whom the online system obtained the training content item. In other embodiments, the online system applies one or more clustering methods to the training content items of the set, to generate clusters of the training content items, where each cluster includes training content items having a common characteristic. In various embodiments, a source from which one or more training content items are obtained may be any homogeneous group, where content items in a group have at least one common characteristic. Including the source from which a training content item was obtained by the online system allows the online system to use the source from which the training content item was obtained as a proxy for a reason why the training content item violated a maintained policy. This labeling of training content items with both a violated policy and a source results in a set of training content items with more fine-grained labels having groups of more visually similar training content items with a common label. As further described below in conjunction with FIGS. 4 and 5, training content items that are each labeled with both a source of the training content item and a policy maintained by the online system that the training content item violated are used by the online system to generate a classification model that determines whether a content item violates at least one policy maintained by the online system based on characteristics of the content item.

System Architecture

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
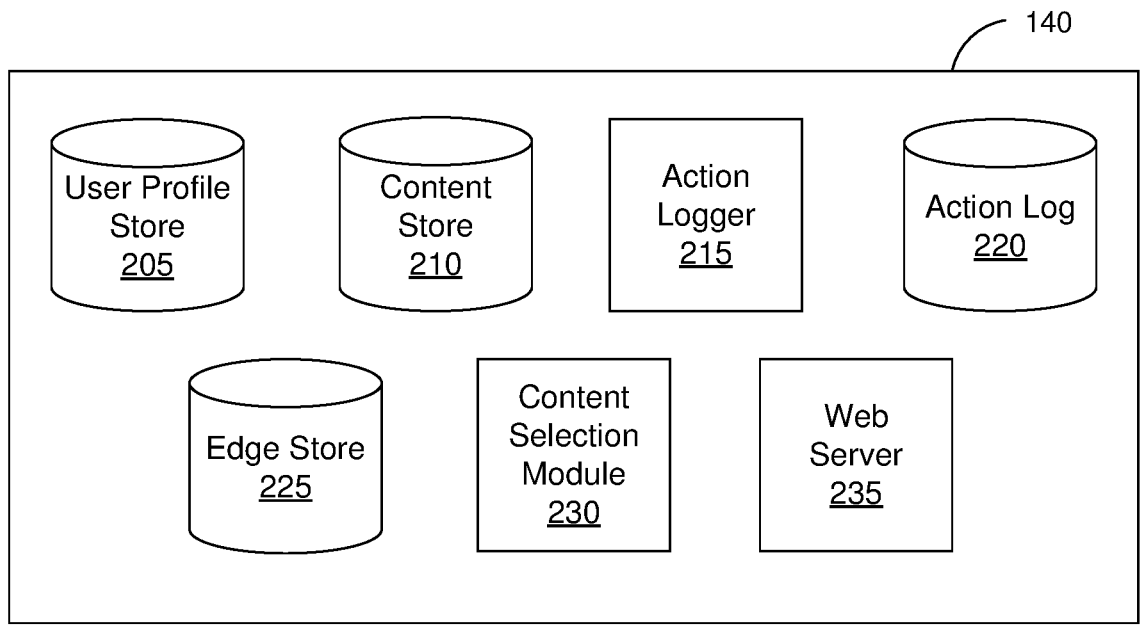
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The content selection module 230 maintains and enforces various policies regulating presentation of content items to users in various embodiments. When selecting content items for presentation to a user, the content selection module 230 determines whether a content item violates one or more maintained policies. If a content item violates a maintained policy, the content selection module 230 withholds the content item from presentation to the user. In various embodiments, different policies identify different objects or characteristics of objects included in content items, so the content selection module 230 does not present content items including certain objects or including objects having certain characteristics from presentation to users. For example, a policy prevents presentation of content items including sexual content, another policy prevents presentation of content including violent content, another policy presents presentation of content items including illegal content, while an additional policy prevents presentation of content items including offensive text. The content selection module 230 maintains any number of policies in various embodiments.

Additionally, the content selection module 230 maintains one or more models and applies the models to content items to generate one or more embeddings identifying features of different content items. In various embodiments, the content selection module 230 includes an embedding model configured to generate an embedding corresponding to a content item. As used herein, an "embedding" refers to descriptive data associated with a content item that indicates characteristics of the content item. Example characteristics of a content item including an image identified by an embedding for the content item include edges in the image, corners in the image, types of objects included in the image. Example characteristics of a content item including text identified by an embedding for the content item include similar words included in the content item. In some embodiments, an embedding of a content item comprises a feature vector having multiple dimensions, with each dimension including a value describing one or more characteristics of the content item. An embedding model applied to content items by the content selection module 230 may be a machine learning model, such as the example further described below in conjunction with FIG. 3.

To more efficiently evaluate content items against one or more policies maintained by the content selection module 230, the content selection module 230 generates a classifier model that identifies a policy violated by a content item or identifies that the content item does not violate at least one policy enforced by the content selection module 230. The content selection module 230 obtains a set of training images that were previously determined to have violated a policy enforced by the content selection module 230. Each training image is labeled with a combination of a source from which the training image was obtained and a policy that the training image violated. As further described below in conjunction with FIG. 4, a source is a group of images having at least one common characteristic. Labeling the training images with the combination of the source from which the training image was obtained and a policy that the training image violated allows the source of the training to act as a proxy for a reason that the training image was determined to violate a policy. As further described below in conjunction with FIG. 4, the content selection module 230 trains the embedding model to generate an embedding for each training image that identifies a combination of a source of the training image and a policy the training image was determined to violate. Based on a comparison of the combination of the source of the training image and the policy the training image was determined to violate generated by the embedding model to the combination of the source from which the training image was obtained and the policy that the training image violated, the content selection module 230 modifies the embedding model, as further described below in conjunction with FIG. 4. From embeddings identifying a combination of a source of an image and a policy the image was determined to violate generated by the embedding model, the content selection module 230 generates a classification model that selects a policy the image violates, as further described below in conjunction with FIG. 4.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Evaluating Content for Compliance with Policies Enforced by the Online System via Machine Learning As described above in conjunction with FIG. 2, the content selection module 230 includes an embedding model configured to generate an embedding corresponding to an image (or to another content item). As used herein, an "embedding" refers to descriptive data associated with a received image (or content item) indicating characteristics of the received image. Example characteristics of an image identified by an embedding for the image include edges in the image, corners in the image, types of objects included in the image. In some embodiments, an embedding of an image comprises a feature vector having multiple dimensions, with each dimension including a value describing one or more characteristics of the image.

Figure 3:
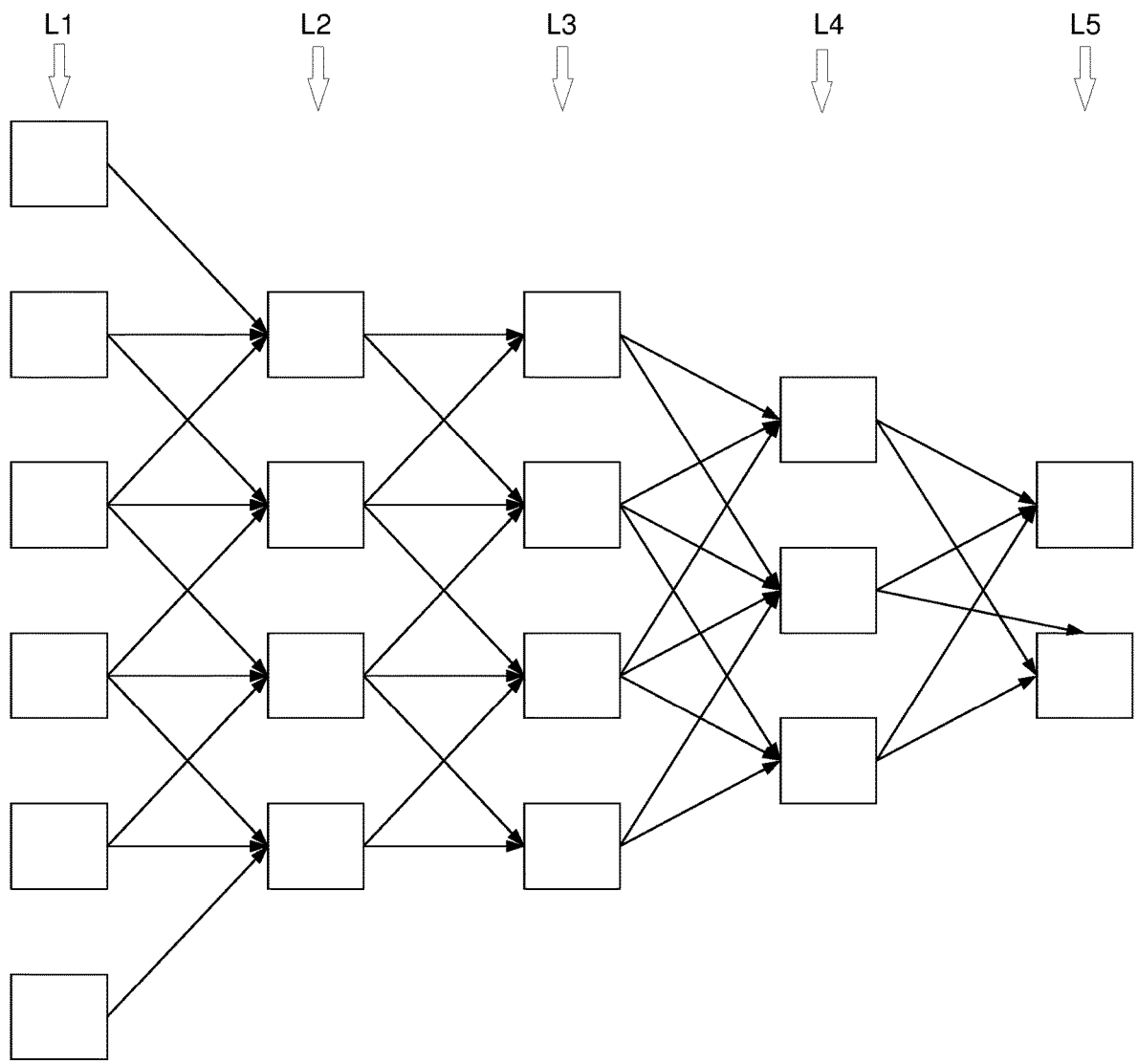
FIG. 3 is an example neural network model that may be used to generate embeddings from a received image, in accordance with an embodiment.

In some embodiments, the embedding model is implemented as a neural network model. FIG. 3 shows an example neural network model 300 that may be used to generate embeddings from a received image. The neural network model 300 shown in FIG. 3, also referred to as a deep neural network, comprises a plurality of layers (e.g., layers L1 through L5), with each of the layers including one or more nodes. Each node has an input and an output, and is associated with a set of instructions corresponding to the computation performed by the node. The set of instructions corresponding to the nodes of the neural network may be executed by one or more computer processors.

Each connection between nodes in the neural network model 300 may be represented by a weight (e.g., numerical parameter determined through a training process). In some embodiments, the connection between two nodes in the neural network model 300 is a network characteristic. The weight of the connection may represent the strength of the connection. In some embodiments, connections between a node of one level in the neural network model 300 are limited to connections between the node in the level of the neural network model 300 and one or more nodes in another level that is adjacent to the level including the node. In some embodiments, network characteristics include the weights of the connection between nodes of the neural network. The network characteristics may be any values or parameters associated with connections of nodes of the neural network.

A first layer of the neural network 300 (e.g., layer L1 in FIG. 3) may be referred to as an input layer, while a last layer (e.g., layer L5 in FIG. 0.3) may be referred to an output layer. The remaining layers (layers L2, L3, L4) of the neural network 300 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer L4.

The layers of the neural network 300 are configured to identify one or more embeddings within the received image. In some embodiments, the layers of the neural network 300 perform classification on the received image (e.g., determine a probability that the received image was obtained from a particular source and that the received image violates a policy enforced by the online system 140). For example, an output of the last hidden layer of the neural network 300 (e.g., the last layer before the output layer, illustrated in FIG. 3 as layer L4) indicates one or more embeddings associated with the received image. The embeddings of the received image may be expressed as a set of vectors (e.g., a 256-bit vector) indicating features of the received image to form a feature vector for the received image. In other embodiments, the output layer of the neural network 300 may output one or more scores associated with the embeddings. For example, each of the output scores may correspond to a probability that the received image was received from a particular source and that the received image violates a particular policy enforced by the online system 140.

In some embodiments, the weights between different nodes in the neural network 300 may be updated using machine learning techniques. As further described below in conjunction with FIG. 4, the neural network 300 may be provided with a training set of images previously determined to have violated one or more policies enforced by the online system 140. Each image in the training set is labeled with a source of the image a policy enforced by the online system 140 that the image was determined to have violated. In some embodiments, the training set comprises a set of feature vectors corresponding to images determined to have violated at least one policy enforced by the online system 140; each feature vector of the training set is associated with a corresponding label identifying a source of the feature vector and the policy that an image corresponding to the feature vector was determined to have been violated. Features of each image of the training set determined by the neural network 300 (e.g., a source of the image determined by the neural network 300 and a policy enforced by the online system 140 determined to be violated by the image) are compared to the source of the image and the policy enforced by the online system 140 that the image was determined to have violated with which each image of the training set is labeled, and the comparison is used to modify one or more weights between different nodes in the neural network 300.

Figure 4:
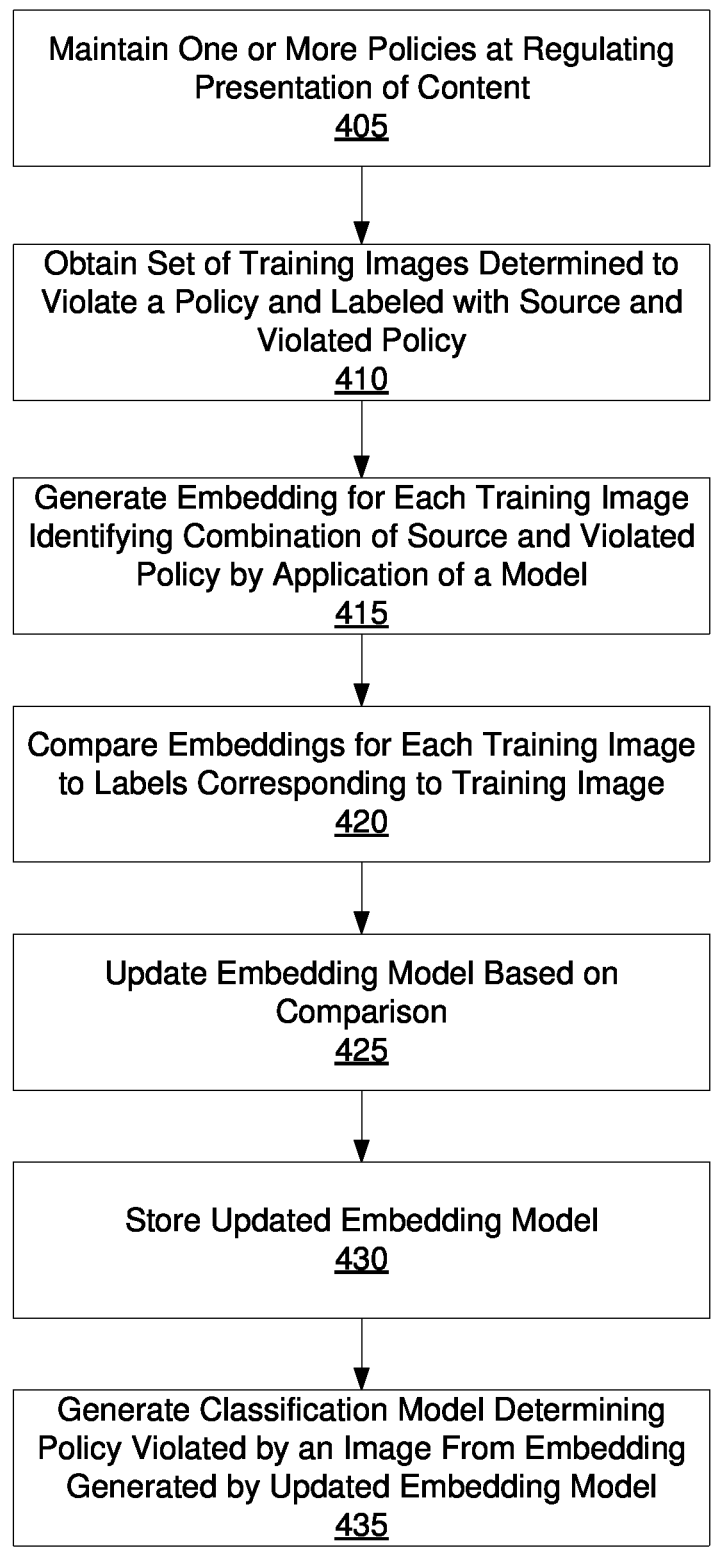
FIG. 4 is a flowchart of a method for generating an embedding for an image identifying compliance of the image with one or more policies enforced by an online system, in accordance with an embodiment.

FIG. 4 is one embodiment of a method for generating an embedding for an image identifying compliance of the image with one or more policies enforced by an online system 140. In various embodiments, the method includes different or additional steps than those described in conjunction with FIG. 4. Additionally, the method may include fewer steps than those described in conjunction with FIG. 4 or perform the steps described in conjunction with FIG. 4 in different orders in some embodiments.

An online system 140 that obtains content items for presentation to users and subsequently presents the content items to other users maintains 405 one or more policies that regulate presentation of obtained content items to users. The online system 140 withholds a content item determined to violate one or more of the maintained policies from presentation to online system users. In various embodiments, different policies identify different objects or characteristics of objects included in images, so the online system 140 does not present images, or other content items, including certain objects or including objects having certain characteristics from presentation to users. For example, a policy prevents presentation of images including sexual content, another policy prevents presentation of images including violent content, another policy prevents presentation of images including illegal content, while an additional policy prevents presentation of images including offensive text. The online system 140 may maintain 405 any suitable number of policies in various embodiments.

To more quickly and more efficiently evaluate images (or other content items) for compliance with the one or more maintained policies, the online system 140 generates embeddings for images obtained by the online system 140, with the embedding identifying whether an image violates a maintained policy. To generate the model, the online system 140 obtains 410 a set of training images that were previously determined to have violated one or more of the maintained policies. For example, one or more reviewers had previously identified each of the training set as violating a policy maintained 405 by the online system 140. As another example, one or more classifiers were previously applied to each training image of the set that identified each of the training images as violating a maintained policy. Each training image of the set is labeled with a combination of a maintained policy that a training image of the set was determined to have violated and a source from which the training image was obtained by the online system 140. For example, a training image is labeled with a combination of an identifier of a policy that the training image was determined to have violated and an identifier of a source from which the training image was obtained.

Because the online system 140 maintains 405 a limited number of policies, labeling training images of the set with only the maintained policy they were determined to have violated would result in training images having significantly different characteristics being labeled as violating the same maintained policy. The disparate characteristics of training images labeled as violating the same policy would prevent the online system 140 from generating a model that generates embeddings for a range of images that accurately identify a policy violated by different images. For example, using a set of training images that are only labeled with a corresponding maintained policy the training images were determined to have violated would result in a model likely to generate embeddings that overfit the set of training images but that are inaccurate for images outside of the set of training images. Hence, labeling training images that have violated at least one maintained policy with only a corresponding policy violated by the different training images would result in a model that accurately identified policies violated by the training images but that less accurately identifies one or more policies violated by images outside of the training images. Such a model is ill-suited for generalization to images or other content obtained by the online system.

To provide more specific labels for the training images, each of the training images is labeled with a combination of a policy that a training image was determined to have violated and a source from which the training image was obtained. This labeling uses the source from which a training image was obtained as a proxy for a sub-category of the maintained policy that the training image was determined to have violated, which allows the online system 140 to identify classes of training images identified as violating a maintained policy that have similar content. Hence, labeling training images with a combination of a maintained policy violated by a training image and a source from which a training images was obtained results in more finely-grained labels for training images, resulting in groups of more visually similar training content items (i.e., training images with a common label of source and violated policy are more likely to have similar visual characteristics).

In various embodiments, a source from which a training image was obtained is a user from whom the online system 140 obtained the training image. Hence, the online system 140 labels a training image of a set with a concatenation of an identifier of a policy the training image was determined to have violated and an identifier of the user from whom the online system 140 obtained the training image. In other embodiments, the online system 140 applies one or more clustering methods to the training images of the set, generating clusters of the training images, where each cluster includes training images having a common characteristic (e.g., training images including a common object); in these embodiments, the online system 140 labels a training image of the set with a concatenation of an identifier of a policy the training image was determined to have violated and an identifier of the cluster from which the online system 140 obtained the training image. Hence, a source from which one or more training images are obtained 410 may be any homogeneous group, where images in a group have at least one common characteristic. In various embodiments, the online system 140 obtains 410 the set of training data from sources including at least a threshold number of images. For example, training images of the set are obtained 410 from users from whom the online system 140 has received at least a threshold number of images. As another example, training images of the set are obtained 410 from clusters that include at least the threshold number of images.

To train a machine learning embedding model that generates an embedding describing evaluation of images against one or more of the maintained policies, the online system 140 applies the machine learning embedding model to each training image of the set. Application of the machine learning embedding model to a training image of the set generates 415 an embedding for the training image that identifies a combination of a source of the training image by determined by the machine learning embedding model (i.e., a "determined source") and a maintained policy that the machine learning embedding model determines the training image violated (i.e., a "determined policy"). Hence, application of the machine learning embedding model to the training images of the set generates 415 an embedding for each training image of the set, with each embedding identifying a combination of a determined source of a training image and a determined policy violated by the training image. In various embodiments, the machine learning embedding model may use any suitable characteristics of a training image to generate the combination of the determined source of the training image and the determined policy that the training image violates.

For each training image of the set to which the machine embedding learning model was applied, the online system 140 compares 420 the combination of the determined source of the training image and the determined policy violated by the training image to the corresponding label of the training image that identifies the combination of the maintained policy the training image was previously determined to have violated and the source from which the training image was obtained. The online system 140 updates 425 the machine learning embedding model based on the comparison of the combination of the determined source of the training image and the determined policy violated by the training image to the combination of the maintained policy the training image was previously determined to have violated and the source from which the training image was obtained identified by the corresponding label of the training image. For example, based on the comparison of the combination of the determined source of the training image and the determined policy violated by the training image to the the combination of the maintained policy the training image was previously determined to have violated and the source from which the training image was obtained from the training image's label, the online system 140 modifies one or more weights between nodes in a neural network model, as further described above in conjunction with FIG. 3. For example, the online system 140 uses multi-class logistic regression to modify one or more weights between nodes in a neural network model based on differences between a combination of the determined source of the training image and the determined policy violated by the training image and the combination of the maintained policy the training image was previously determined to have violated and the source from which the training image was obtained from the training image's label. In the preceding example, the online system 140 iteratively applies the updated machine learning model to each training image of the set, compares 420 the combination of the determined source of the training image and the determined policy violated by the training image to the combination of the maintained policy the training image was previously determined to have violated and the source from which the training image was obtained for each training image from the training image's label, and modifies weights between nodes of the updated machine learning embedding model based on the comparison. The online system repeats the preceding steps until the machine learning embedding model has been applied to the training images of the set a specific number of times or until differences between a combination of the determined source of the training image and the determined policy violated by the training image and the combination of the maintained policy the training image was previously determined to have violated and the source from which the training image was obtained from the training image's label do not exceed a threshold difference. The online system 140 subsequently stores 430 the updated machine learning embedding model. By training the machine learning embedding model from training images each labeled with a source of the training image and a policy violated by the training image, the online system 140 uses more similar groups of training content items (e.g., training images having a common label of an image's source and the policy violated by an image are visually similar) to train the machine learning embedding model. This use of more similar groups of training content items causes the updated machine learning embedding model to provide accurate results for evaluating content items outside of the set of training content items for violations of one or more policies maintained by the online system 140, making the updated machine learning embedding model more readily generalizable to images outside of the set of training images.

The online system 140 generates 435 a classification model from the embeddings generated by the updated machine learning embedding model, where the classification model predicts a maintained policy violated by an image based on the embedding generated for the image, where the embedding generated for the image identifies a combination of a source of the training image determined by the machine learning embedding model (i.e., a "determined source") and a maintained policy that the machine learning embedding model determines the training image violated (i.e., a "determined policy"). In some embodiments, the online system 140 generates 435 the classification model by freezing weights in layers in a neural network prior to an output layer of the neural network and modifies weights between the output layer and an adjacent layer prior to the adjacent layer by applying the classification model to training images previously determined to have violated a maintained policy and labeled with the violated policy, comparing the policy the classification model determined a training image violated to a label identifying a policy the training image violated, and modifying weights between nodes in the output layer and nodes in the adjacent layer prior to the output layer, as further described above when updating the machine learning model. Hence, the online system 140 may use the machine learning embedding model that generates embeddings for images as the classification model to identify a policy that an image violated based on the embedding identifying the combination of the source of the image and a policy the image was determined to have violated. The training images used when generating 435 the classification model may be the training images used to generate the machine learning model, or may be alternative training images also previously determined to have violated a maintained policy.

In another embodiment, the online system 140 generates 435 the classification model by adding one or more additional layers to the updated machine learning embedding model, with one of the additional layers coupled to the layer of the machine learning embedding model that generates the embedding identifying a combination a determined source and a determined policy. Alternatively, the classification model is a separate model that receives the embedding for an image identifying a combination of a source of the training image by determined by the updated machine learning embedding model (i.e., a "determined source") and a maintained policy that the updated machine learning embedding model determines the training image violated (i.e., a "determined policy"), and selects a maintained policy the image violates based on the embedding for the image. In some embodiments, the classification model is a gradient boosted decision tree. In other embodiments, other types of machine-trained models may be used, such as other types of decision trees, a neural network model, etc. The separate classification model may be trained using training images that are each labeled with a maintained policy violated by a training image, as further described above regarding updating 425 the machine learning embedding model. In various embodiments, the classification model generates a value indicating an image does not violate at least one policy maintained 405 by the online system 140. Because the updated machine learning embedding model is more readily generalizable to a broader range of content items, as further described above, the classification model is also more generally applicable to a more diverse range of images obtained by the online system 140.

Figure 5:
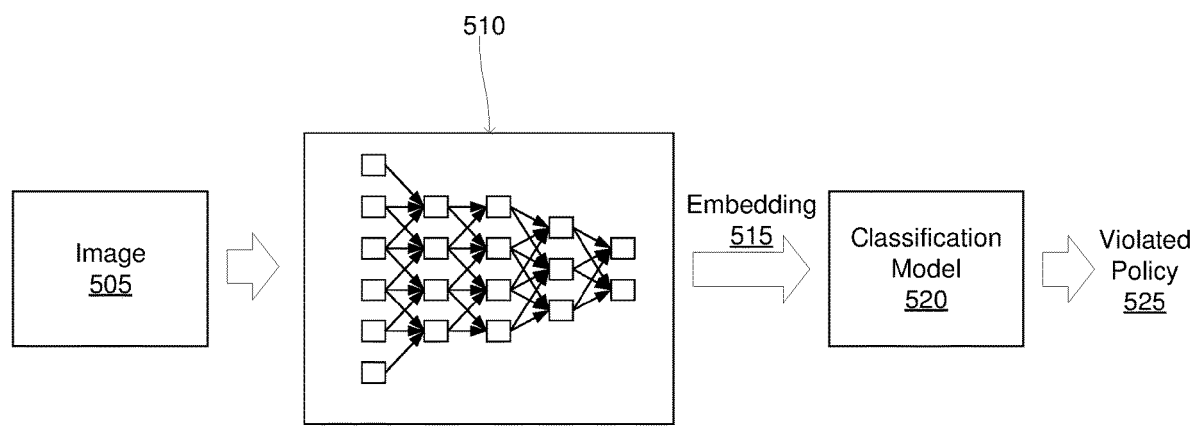
FIG. 5 is a process flow diagram of an online system using a classification model to identify whether an image violates one or more policies regulating presentation of content maintained by the online system, in accordance with an embodiment.

FIG. 5 shows a process flow diagram of one embodiment of an online system 140 using a classification model to identify whether an image violates one or more policies regulating presentation of content maintained by the online system 140. In the example of FIG. 5, the online system 140 obtains an image 505 and applies a machine learning embedding model 510 to the image 505 to generate an embedding 515 that identifies features of the image 505. As further described above in conjunction with FIG. 4, the embedding 515 generated by the machine learning embedding model 510 includes a combination of a source from which the image 505 was obtained by the online system 140 determined byte machine learning embedding model 510 (a "determined source") and a maintained policy the machine learning embedding model 510 determined the image 505 violated (a "determined policy"). From the generated embedding 515, the classification model 520 selects a maintained policy 525 that the image 505 violated or generates a value indicating that image 505 does not violate at least one policy maintained by the online system 140. For purposes of illustration, FIG. 5 shows the classification model 520 as a separate model than the embedding model 510; however, in various embodiments, the classification model 520 comprises one or more layers included in the embedding model 510.

For purposes of illustration, FIGS. 3-5 describe identifying a maintained policy regulating content presented by online system 140 that an image violates. However, in other embodiments, the online system 140 performs the steps described above in conjunction with FIG. 4 to generate a machine learning embedding model and a classification model that select a policy maintained by the online system 140 that content items violate based on training content items each previously determined to have violated a policy maintained by the online system 140 and labeled with a combination of a source of the training content item and a policy that the training content item was determined to have violated, similar to the training images further described above in conjunction with FIG. 4. The content items may include text data, video data, image data, or any combination thereof in various embodiments. Hence, the method described above in conjunction with FIGS. 4 and 5 may be used to update a machine learning embedding model applicable to content items including different types of content and to generate a classification model for selecting a maintained policy violated by a content item including different types of content or for indicating that the content item does not violate at least one policy maintained by the online system 140.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining one or more policies at an online system, each policy identifying one or more objects in images causing the online system to prevent presentation of the images to users;
   obtaining a set of training images, each training image previously determined to have violated one or more policies maintained by the online system and each training image labeled with a policy maintained by the online system violated by the training image and a source of the training image;
   for each training image of the set, using a machine learning embedding model to generate an embedding for the training image, the embedding identifying a combination of a determined source of the training image and a determined policy violated by the training image from characteristics of the training image;
   for each training image of the set, comparing the determined source of the training image and the determined policy violated by the training image to the policy enforced by the online system violated by the training image with which the training image was labeled and to the source of the training image with which the training image was labeled;
   updating the machine learning embedding model based on the comparing; and
   storing the updated machine learning embedding model at the online system.

2. The method of claim 1, further comprising:
   generating a classification model that receives an embedding generated for an image by the updated machine learning embedding model that identifies a combination of a determined source of the image and a determined policy violated by the image and that selects a policy maintained by online system violated by the image based on the embedding received from the updated machine learning model.

3. The method of claim 2, wherein the classification model is a separate model from the updated machine learning embedding model.

4. The method of claim 2, wherein the machine learning embedding model comprises multiple layers, and the classification model comprises one or more layers of the machine learning embedding model.

5. The method of claim 2, further comprising:
   obtaining an additional image;
   determining whether the additional image violates one or more maintained policies by applying the machine learning embedding model and the classification model to the additional image.

6. The method of claim 1, wherein the source of the training image comprises a user of the online system from whom the training image was obtained.

7. The method of claim 6, wherein the online system has received at least a threshold number of images from the user.

8. The method of claim 1, wherein the source of the training image comprises an identifier of a cluster of images from which the training image was obtained, each image of the cluster having a common characteristic.

9. The method of claim 8, wherein the cluster includes at least a threshold number of images.

10. A method comprising:
    maintaining one or more policies at an online system, each policy identifying one or more characteristics of content items causing the online system to prevent presentation of the images to users;
    obtaining a set of training content items, each training content item previously determined to have violated one or more policies maintained by the online system and each training content item labeled with a policy maintained by the online system violated by the training content item and a source of the training content item;
    for each training content item of the set, using a machine learning embedding model to generate an embedding for the training content item, the embedding identifying a combination of a determined source of the training content item and a determined policy violated by the training content item from characteristics of the training content item;
    for each training content item of the set, comparing the determined source of the training content item and the determined policy violated by the training content item to the policy enforced by the online system violated by the training content item with which the training image was labeled and to the source of the training content item with which the training image was labeled;
    updating the machine learning embedding model based on the comparing; and
    storing the updated machine learning embedding model at the online system.

11. The method of claim 10, further comprising:
    generating a classification model that receives an embedding generated for content item by the updated machine learning embedding model that identifies a combination of a determined source of the content item and a determined policy violated by the content item and that selects a policy maintained by online system violated by the content item based on the embedding received from the updated machine learning model.

12. The method of claim 10, wherein the source of the training content item comprises a user of the online system from whom the training content item was obtained.

13. The method of claim 12, wherein the online system has received at least a threshold number of content items from the user.

14. The method of claim 10, wherein the source of the training content item comprises an identifier of a cluster of images from which the training content item was obtained, each content item of the cluster having a common characteristic.

15. The method of claim 14, wherein the cluster includes at least a threshold number of content items.

16. A computer program product comprising a non-transitory computer readable storage medium having instructions encoded thereon that, when executed by a processor, cause the processor to:
   maintain one or more policies at an online system, each policy identifying one or more objects in images causing the online system to prevent presentation of the images to users;
   obtain a set of training images, each training image previously determined to have violated one or more policies maintained by the online system and each training image labeled with a policy maintained by the online system violated by the training image and a source of the training image;
   for each training image of the set, use a machine learning embedding model to generate an embedding for the training image, the embedding identifying a combination of a determined source of the training image and a determined policy violated by the training image from characteristics of the training image;
   for each training image of the set, compare the determined source of the training image and the determined policy violated by the training image to the policy enforced by the online system violated by the training image with which the training image was labeled and to the source of the training image with which the training image was labeled;
   update the machine learning embedding model based on the comparing; and
   store the updated machine learning embedding model at the online system.

17. The computer program product of claim 16, wherein the non-transitory computer readable storage medium further has instructions encoded thereon that, when executed by the processor, cause the processor to:
   generate a classification model that receives an embedding generated for an image by the updated machine learning embedding model that identifies a combination of a determined source of the image and a determined policy violated by the image and that selects a policy maintained by online system violated by the image based on the embedding received from the updated machine learning model.

18. The computer program product of claim 16, wherein the source of the training content item comprises a user of the online system from whom the training content item was obtained.

19. The computer program product of claim 18, wherein the online system has received at least a threshold number of content items from the user.

20. The computer program product of claim 16, wherein the source of the training content item comprises an identifier of a cluster of images from which the training content item was obtained, each content item of the cluster having a common characteristic.

\* \* \* \* \*